(12) United States Patent
Rayner

(10) Patent No.: US 11,403,609 B2
(45) Date of Patent: *Aug. 2, 2022

(54) RECHARGEABLE DEVICES AND KIOSKS FOR SAME

(71) Applicant: Dignan Rayner, Eight Mile Plains (AU)

(72) Inventor: Dignan Rayner, Eight Mile Plains (AU)

( * ) Notice: Subject to any disclaimer, the term of this patent is extended or adjusted under 35 U.S.C. 154(b) by 129 days.

This patent is subject to a terminal disclaimer.

(21) Appl. No.: 17/064,805

(22) Filed: Oct. 7, 2020

(65) Prior Publication Data

US 2021/0019720 A1   Jan. 21, 2021

Related U.S. Application Data

(62) Division of application No. 16/309,218, filed as application No. PCT/AU2017/050592 on Jun. 14, 2017, now Pat. No. 10,846,674.

(30) Foreign Application Priority Data

Jun. 15, 2016   (AU) ................................ 2016902353

(51) Int. Cl.
  *G06Q 20/18*        (2012.01)
  *G06Q 20/32*        (2012.01)
  (Continued)

(52) U.S. Cl.
  CPC ......... *G06Q 20/18* (2013.01); *G06Q 20/3276* (2013.01); *H01M 10/425* (2013.01); *H01M 50/20* (2021.01)

(58) Field of Classification Search
  CPC .. G06Q 20/18; G06Q 20/3276; G06Q 30/018; H01M 10/425; H01M 50/20; Y02E 60/10
  See application file for complete search history.

(56) References Cited

U.S. PATENT DOCUMENTS 6,562,504 B2 * 5/2003 Faris .................... H01M 6/5011
                                                                429/432
6,800,393 B2 * 10/2004 Faris .................... H01M 12/06
                                                                429/129

(Continued)

FOREIGN PATENT DOCUMENTS

FR            2970125 A1 *  7/2012  ................ B60L 3/12
KR    20140115336 A  *  1/2013
(Continued)

OTHER PUBLICATIONS

Iland, Daniel, and Elizabeth Belding. "Open Charging Kiosk: A Business in a Box." Proceedings of the Fifth ACM Symposium on Computing for Development. ACM, 2014. 129-130. Web. (Year: 2014).*

(Continued)

*Primary Examiner* — Ashford S Hayles
(74) *Attorney, Agent, or Firm* — Epstein Drangel LLP; Robert L. Epstein

(57) ABSTRACT

A system for enabling electrical devices to exchange either battery or battery fluids or reagents that supply the energy for the battery or device with new recharged batteries or battery fluids or reagents for use in equipment including vehicles, excavating and earthmoving equipment, tractors and agricultural equipment or aircraft, smaller devices such as mobile phones, telecommunication devices and portable computers. This system involves handling and billing systems to ensure this is all done and that satisfactory payment to the supplier parties is achieved. The system involves packaging reagents such as enzymes, anodes, gases, etc. in sealed systems in order to ensure their integrity or having control over the delivery and retrieval and internal use systems to ensure the reagent is kept secure and uncontaminated.

4 Claims, 3 Drawing Sheets

(51) Int. Cl.
*H01M 10/42* (2006.01)
*H01M 50/20* (2021.01)

(56) References Cited

U.S. PATENT DOCUMENTS

| | | | | |
|---|---|---|---|---|
| 8,355,965 | B2* | 1/2013 | Yamada | G06Q 10/30 |
| | | | | 705/30 |
| 9,096,141 | B2* | 8/2015 | Soong | H02J 7/0027 |
| 9,123,035 | B2* | 9/2015 | Penilla | G01C 21/3469 |
| 9,182,244 | B2* | 11/2015 | Luke | B60L 1/003 |
| 9,203,245 | B2* | 12/2015 | Aloe | G06Q 20/18 |
| 9,573,479 | B2* | 2/2017 | Yun | B60L 53/63 |
| 9,716,401 | B2* | 7/2017 | Wojcik | H02J 7/025 |
| 10,084,329 | B2* | 9/2018 | Hamilton | G07F 17/0042 |
| 10,183,563 | B2* | 1/2019 | Rayner | B62K 27/003 |
| 10,239,638 | B1* | 3/2019 | Cohen | B64F 1/22 |
| 10,243,375 | B2* | 3/2019 | Toya | H02J 7/00047 |
| 10,282,934 | B2* | 5/2019 | Yuan | H04M 9/08 |
| 10,600,116 | B2* | 3/2020 | Takatsuka | B60L 53/80 |
| 10,650,444 | B2* | 5/2020 | Takatsuka | H02J 7/00 |
| 2003/0209375 | A1* | 11/2003 | Suzuki | H02J 7/00 |
| | | | | 180/68.5 |
| 2007/0069901 | A1* | 3/2007 | Tuck | G06Q 30/02 |
| | | | | 340/573.1 |
| 2007/0084523 | A1* | 4/2007 | McLean | G06Q 50/06 |
| | | | | 705/400 |
| 2007/0124164 | A1* | 5/2007 | Gary | G06Q 30/0601 |
| | | | | 705/26.1 |
| 2008/0183752 | A1* | 7/2008 | Jain | G06Q 30/06 |
| 2009/0198372 | A1* | 8/2009 | Hammerslag | B60L 53/305 |
| | | | | 700/226 |
| 2009/0252994 | A1* | 10/2009 | Livingston | H01M 10/647 |
| | | | | 429/1 |
| 2010/0088192 | A1* | 4/2010 | Bowles | G06Q 10/30 |
| | | | | 348/E5.022 |
| 2010/0141206 | A1* | 6/2010 | Agassi | B60K 1/04 |
| | | | | 320/109 |
| 2012/0129577 | A1* | 5/2012 | Vaknin | H02J 7/0013 |
| | | | | 455/573 |
| 2012/0262111 | A1* | 10/2012 | Soong | B60L 53/80 |
| | | | | 320/109 |
| 2013/0063073 | A1* | 3/2013 | Kawasaki | H02J 7/0013 |
| | | | | 307/66 |
| 2013/0332370 | A1* | 12/2013 | Hyde | B60L 58/10 |
| | | | | 705/306 |
| 2014/0201090 | A1* | 7/2014 | Liang | B60L 58/16 |
| | | | | 324/426 |
| 2014/0368156 | A1* | 12/2014 | Aloe | H02J 7/0013 |
| | | | | 320/106 |
| 2015/0249353 | A1* | 9/2015 | Hamilton, IV | G06Q 20/18 |
| | | | | 320/114 |
| 2015/0280465 | A1* | 10/2015 | Lin | B60L 3/04 |
| | | | | 320/137 |
| 2015/0307068 | A1* | 10/2015 | Gaffoglio | B60L 50/60 |
| | | | | 414/809 |
| 2015/0367743 | A1* | 12/2015 | Lin | B60L 53/305 |
| | | | | 320/109 |
| 2016/0028263 | A1* | 1/2016 | Yau | H02J 7/007 |
| | | | | 320/134 |
| 2016/0034980 | A1* | 2/2016 | Petrie | G06Q 30/0278 |
| | | | | 705/306 |
| 2016/0039295 | A1* | 2/2016 | Madurai-Kumar | B60L 53/64 |
| | | | | 320/109 |
| 2016/0039299 | A1* | 2/2016 | Nguyen | B60L 53/80 |
| | | | | 320/109 |
| 2016/0180632 | A1* | 6/2016 | Santana | H02J 7/0027 |
| | | | | 700/238 |
| 2016/0267579 | A1* | 9/2016 | Toya | H02J 7/0042 |
| 2016/0283999 | A1* | 9/2016 | Toya | G06Q 30/0643 |
| 2016/0300424 | A1* | 10/2016 | Jones | G07F 15/005 |
| 2016/0335616 | A1* | 11/2016 | Bordeleau | G06Q 20/18 |
| 2017/0182908 | A1* | 6/2017 | Yang | B60L 58/21 |
| 2018/0248388 | A1* | 8/2018 | Takatsuka | H02J 7/0021 |
| 2018/0251102 | A1* | 9/2018 | Han | B60L 50/66 |
| 2019/0126775 | A1* | 5/2019 | Han | B60L 3/0046 |
| 2019/0140231 | A1* | 5/2019 | Huang | B60K 1/04 |

FOREIGN PATENT DOCUMENTS

| | | | | |
|---|---|---|---|---|
| WO | WO-2011138442 A1 | * | 11/2011 | B60S 5/06 |
| WO | WO-2013080211 A1 | * | 6/2013 | B60L 11/1822 |
| WO | WO-2016086274 A1 | * | 6/2016 | B60K 1/04 |
| WO | WO-2016153238 A1 | * | 9/2016 | G06K 19/06037 |
| WO | WO-2017157245 A1 | * | 9/2017 | B60K 1/04 |

OTHER PUBLICATIONS

S. Guo et al., "Design and implementation of the KioskNet system," 2007 International Conference on Information and Communication Technologies and Development, 2007, pp. 1-10, doi: 10.1109/ICTD.2007.4937417. (Year: 2007).*

R. Ellis, C. Fackrell, T. Gordon, P. Lamb, J. E. Morris and C. Kawasaki, "Battery recharging and testing swap stations," 2013 1st IEEE Conference on Technologies for Sustainability (SusTech), 2013, pp. 208-211, doi: 10.1109/SusTech.2013.6617322. (Year: 2013).*

L. Xinyi, L. Nian, H. Yangqi, Z. Jianhua and Z. Nan, "Optimal configuration of EV battery swapping station considering service availability," 2014 International Conference on Intelligent Green Building and Smart Grid (IGBSG), 2014, pp. 1-5, doi: 10.1109/IGBSG.2014.6835217. (Year: 2014).*

X. Tan, B. Sun and D. H. K. Tsang, "Queueing network models for electric vehicle charging station with battery swapping," 2014 IEEE International Conference on Smart Grid Communications (SmartGridComm), 2014, pp. 1-6, doi: 10.1109/SmartGridComm.2014.7007613. (Year: 2014).*

L. Jian, Guoqing Xu, Honghong Xue and Ming Chang, "Intelligent multi-mode energy-refreshing station for electric vehicles within the framework of smart grid," 2011 IEEE International Conference on Information and Automation, 2011, pp. 534-539, doi: 10.1109/ICINFA.2011.5949051. (Year: 2011).*

M. R. Sarker, H. Pandžić and M. A. Ortega-Vazquez, "Electric vehicle battery swapping station: Business case and optimization model," 2013 International Conference on Connected Vehicles and Expo (ICCVE), 2013, pp. 289-294, doi: 10.1109/ICCVE.2013.6799808. (Year: 2013).*

Y. Wang, L. Huang, H. Wei, W. Zheng, T. Gu and H. Liu, "Planning Battery Swapping Stations for Urban Electrical Taxis," 2015 IEEE 35th International Conference on Distributed Computing Systems, 2015, pp. 742-743, doi: 10.1109/ICDCS.2015.87. (Year: 2015).*

Zheng Chen, Nian Liu, Xiangning Xiao and jianhua Zhang, "Energy exchange model of PV-based battery switch stations based on battery swap service and power distribution," 2013 IEEE Energytech, 2013, pp. 1-6, doi: 10.1109/EnergyTech.2013.6645314. (Year: 2013).*

* cited by examiner

RECHARGEABLE DEVICES AND KIOSKS FOR SAME

CROSS-REFERENCE TO RELATED APPLICATIONS

Priority is claimed on U.S. Utility patent application Ser. No. 16/309,218, filed Dec. 12, 2018, PCT International Application No. PCT/AU2017/050592, filed Jun. 14, 2017, Australian Patent Application No. 2016902353, filed Jun. 15, 2016 the contents of which are incorporated herein by reference.

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

FIELD OF INVENTION

The present invention relates to a system comprising the handling and billing systems of swap batteries to ensure that all of the requisite transactions are completed satisfactorily and that satisfactory payment to the supplier parties is achieved and for secure handling, storage and charging of swap batteries used in telecommunication and portable computing devices. A key to the technology is either packaging reagents such as enzymes, anodes, gases etc. in sealed systems in order to ensure their integrity or having control over the delivery, retrieval and internal use systems to ensure that the reagent is kept secure and uncontaminated.

BACKGROUND

The fundamental difference between the use of combustible fuels and electricity is that electricity requires a carrier agent. That may be a solid battery based system or solution (s) which then react to produce electricity but the electricity is contained within the reagents which then remain (and/or their end products) after the reaction has finished. The reagents then need to be used again because the main cost of the reaction is the reagents not the electricity which can be generated externally.

Combustibles on the other hand disappear on use. They burn and go out the exhaust pipe. They are sold as combustibles; what the customer does with and to them after that is their problem. If they add substances to increase the explosive capability of the combustible; that is their problem. They can explode their whole engine if they wish that is their own problem. Not so with electricity reagents that require recycling. They are the supplier's problem, they cost far more than the electricity and in many cases require 200+ recharge cycles in order for the distributor of the swap batteries or reagent to recoup their cost.

The use of combustibles allows vehicles to go up to 1000 km on a tank of fuel. The electrification of cars for anything other than short distances or short term usage (i.e. 1-3 hours) requires exchange of the battery or reagent in the system. Thus resident in-built batteries are acceptable if the vehicle is only used 30-70 km/day as occurs in some places with scooters. Continuous travel for long distances needs a swap system. Thus the supplier/distributer of the system needs a mechanism to ensure that the carrier agent is used in a closed loop/circuit operating system so as to ensure that the reagent is not damaged or tampered with and to ensure the ongoing integrity of the reagent because if the reagent is faulty or tampered with and then causes a client's engine to blow up it is the distributor's problem (at heir liability cost) not the customers'.

Thus the key feature of these ITS (Integrated Transport Solutions) systems is to ensure the electricity carrier agent (be it a liquid, solid, aerosol, gas and/or a mixture of any of these including or without anode, cathode, enzyme or catalyst replacement systems being incorporate into reactions) are kept safe, secure and reusable. This means that the type of battery system/technology used is not relevant provided it fits in with the required protocols, it can be used in the system. This means that battery suppliers can also get their batteries to market sooner provided the safety protocols required are met for their product.

SUMMARY OF INVENTION

The present invention provides a system for enabling electrical devices to exchange either battery or battery fluids or reagents that supply the energy for the battery or device with new recharged batteries or battery fluids or reagents for use in equipment including vehicles, excavating and earth-moving equipment, tractors and agricultural equipment or aircraft, smaller devices such as mobile phones, telecommunication devices and portable computers Preferably, batteries for use in the devices can be swapped at or in reception/shop type processes or in automated self-service kiosks.

Preferably, the kiosk located in vendor sites will be of different dimensions depending on where it is installed including a counter-top or floor-standing kiosks; the kiosk has a minimum of 3-4 battery slots so it can take small; medium and large batteries; an on-board processor/computer; a power lead to plug into the power point; a slot for receiving coins plus one for notes; a card reader/key pad as required; a contactless payment sensor; an outlet for change and positions to put the devices into so its unique identifier can be read and integrated to allow the network to determine which device the battery is coming from and which battery it is releasing to that device; and the slot supports a clamp to hold the battery or telecommunication/portable computing devices while it is being checked and a steal in mechanism to capture stolen or illegal devices.

Preferably, the battery swap procedure removes the battery pack from the battery slot in the rear of device and replaces it with a fully charged battery such that the preferred order of operations is kiosk computer system first checks the KSB (Kiosk Swap Battery) barcode; if all is in order it requests the device to be put in the device slot; it then checks the device's unique identifier and integration license with the barcode/encryption identifier before linking with the electrical contacts on the device; if everything is not in order with the barcode etc. it will not link electrically; if everything is in order it then links with the battery control system in the KSB with the electrical contacts and checks everything is in order before doing the swap; the chip on the battery tracks its movements, ID, phone use and charging; if all is in order it (Kiosk) removes the battery pack (BPac) and puts it on a slot to recharge it; requests the customer pay for the new one and then issues the new BPac.

Preferably, the swap battery comprises holes which poles of the device slot into; the poles are sealed into the device so that in event of moisture being present it does not enter the device; the battery holes comprise sealing rings around them so that once they are in position the sealing ring prevents any moisture entering the battery or KSB; the computer control system (CCS) on the KSB contacts a contact either underneath the battery or on one of the device pole contact sites or on an extension/protrusion of the battery (KSB) so that it can upload and receive information; all extensions and contact point/poles are sealed into the back of the device and/or battery to prevent moisture entry and have a rubber/plastic sealing ring on the outside prevent moisture entry into the contact area when the KSB or battery is in position; poles may have multiple contact points; so each pole may have 2-F contact sites which are separated by insulating material and align with contacts within the device/battery holes and so can receive/transmit power and/or information; and the batteries may also have a pole for contact sets in the middle between the 2 holes or alternatively a third hole with a third pole in the device to handle communication transmissions.

Preferably, the device has one resident battery which is inbuilt and one or more swap batteries which are stored in receptacles on the rear of the device and covered by doors that open, close and lock.

Preferably, the battery comprises an extra pin between the main pinholes to allow devices and chargers to easily recognise the types of batteries such that a hole on the device will take the pin if the battery is installed.

In another aspect, the present invention provides a system for recharging devices comprising liquid systems or battery fluids fluid which can be recharged within vehicles with an external electrical charging system that plugs into the vehicle or transport equipment and recharges an electrical storage system in a vehicle or recycles electricity when the vehicle travels down slopes and in braking or alternatively discharged solutions and battery fluids or reagents which can be swapped for recharged fluids/reagents.

Preferably, a liquid/solute battery control mechanism provides total control over fluids entering and leaving the system comprising a liquid fuel inlet/outlet port which is sealed, and an electronic hold gate on the front side that will only open in the presence of an opening nozzle that can communicate with an opening port in an electronically coded manner.

Preferably, the nozzles have a two way in and out process to enable one part of the nozzle to put/deliver fluid into the system and the other part to suck it out; the fluid coming out comes out of the system is in a used fluid compartment comprising a separate bag liner containing it; used fluid is pumped out through pipes on one side of the nozzle and recharged fluid is pumped in through a separate pipe in another part of the nozzle.

Preferably, the system further comprises a computer control system including a computer chip in batteries or monitoring the fluid containment storage devices and anode or other cartridge systems.

Preferably a system for ensuring that the integrity of any liquid reagents is maintained and that outside and unauthorised parties cannot tamper with the reagents between swaps;

A system for sealing the inlet and outlet ports to the reagent receptacles in the user device so as to prevent tampering of any kind to/with the reagent by use of gas or other sealing systems including but without limitation vacuum systems.

Preferably, a computer device installed in the vehicle communicates to the nozzle how much energy has been taken from the fluid since the last recharge; how much has been used from the bags and how much has been internally recharged in the system either using solar or grid power supplies so that the customer can be charged correctly for the amount of energy used.

Preferably, the batteries for the system for use in vehicles and larger devices comprises an electrolytic solution of lithium polysulphide solution interposed between an electrode and the rest of the battery.

Preferably, the system further comprises Anodes, cathodes and enzymes reagents as replacements packs which are stored in cartridges.

Preferably, the system comprises an Electrode replacement pack such as an "Anode cartridge replacement system".

Preferably, the battery works by a fully charged solution of Solute A and Solute B being positioned in respective sides of the battery.

Preferably, the battery is recharged by putting new batches of unreacted fully charged liquid on each side.

Preferably, the two sets of solute A and B are stored in compartmentalised systems so that charged solute is kept separate to discharged solute.

Preferably, the system according to the present invention is used in vehicles, aviation, drones, trains, large mobile devices and buildings including homes.

Preferably, telecommunication and other mobile device comprises a computer control system including a computer chip in batteries to identify the user, to record battery swaps and to calculate charges for billing purposes.

Preferably the KSB (Kiosk Swap Battery) has a barcode, readable encryption identifier or unique identifier; that can be read with a optical or other barcode or other reader before linking the battery with the electrical contacts on the kiosk; Preferably a mobile, telecommunications and portable computing device that uses KSB's and using the ITS system as previously described can accept swap batteries and work in an ITS network situation.

The chip (CCS) on the KSB has the ability to allow or deny the acceptance of electricity from any supply sources and particularly to deny supply of electricity from unauthorised sources.

A mobile, telecommunications and portable computing device that uses an ITS charging interface to link to a power supplier and or grid operator to receive power in accordance with ITS electricity supply protocols whereby the KSB's in the device can receive power from the authorised energy supplier after the supply protocols and authorisations have been received.

A system for ensuring that all and any power that is received from an unauthorised supplier a log is kept on the amount of energy received from the unauthorised provider in a manner that enables the users deposit to be reduced or charged for such power upon return of the battery A system for ensuring that if a user is recharging their phone on an authorised home or office electricity supply any recharge of KSB's is charged to the user on their own (home or office) electricity account at correct ITS authorised rates and that the ITS part/portion of the electricity charges is remitted by electricity supplier to the ITS licensed representative in the nation.

A system for allowing users to lend KSB's or NIB's to other phone users for emergency use;

A system for allowing users to hand their KSB's over to other users and replace later at kiosks. The system for ensuring that the integrity of any liquid reagents is maintained and not compromised and that outside and unauthorised parties cannot tamper with the reagents between swaps.

The system for sealing the inlet and outlet ports and electronically monitoring the seals in the ports to ensure they are not broken or tampered with during usage and to maintain integrity.

The system for use in vehicles, aviation, drones, trains, mobile devices and buildings including domestic and commercial premises.

The system wherein telecommunication and other mobile devices comprise a computer control system including a computer chip in batteries using ITS, operating within ITS operating system protocols, to identify the user, to record battery swaps and to calculate charges for billing purposes.

In another aspect, the present invention provides a method of recharging devices using the system according to the present invention.

DETAILED DESCRIPTION OF INVENTION

Figure 1:
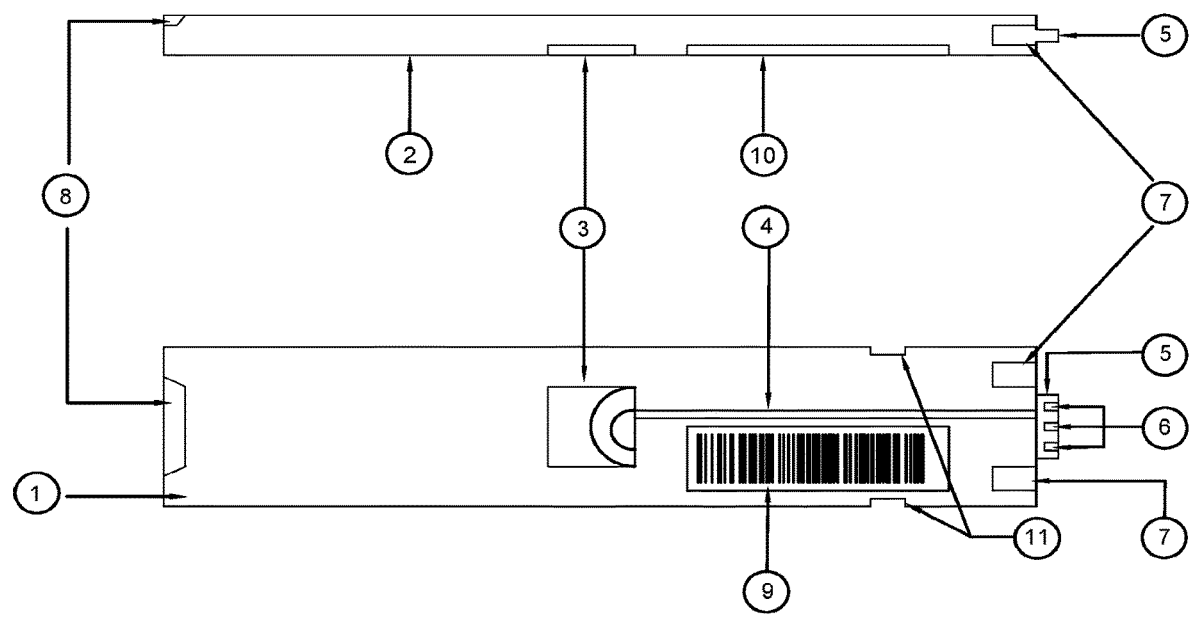
FIG. 1 shows the rear and side views of the device as an embodiment of the present invention

FIG. 1 shows the rear (1) and side (2) scene/views of KSB, NIB or Bpac with the CCS/chip (3) which is connected/attached with a connection (4) to the contact post (5) at KSB's end and exchanges communications with/to the device via the contacts (6); the two holes (7) which the poles on/of the device plug into to transmit power or information. It also has a thumb/fingernail slot (8) to assist the person to remove the Bpac or KSB from the device. It also shows the barcode (9) and barcode slot (10) with the removal cuts/slots (11) that the kiosk BPac retrieval clamp is able to attach/latch onto.

Figure 2:
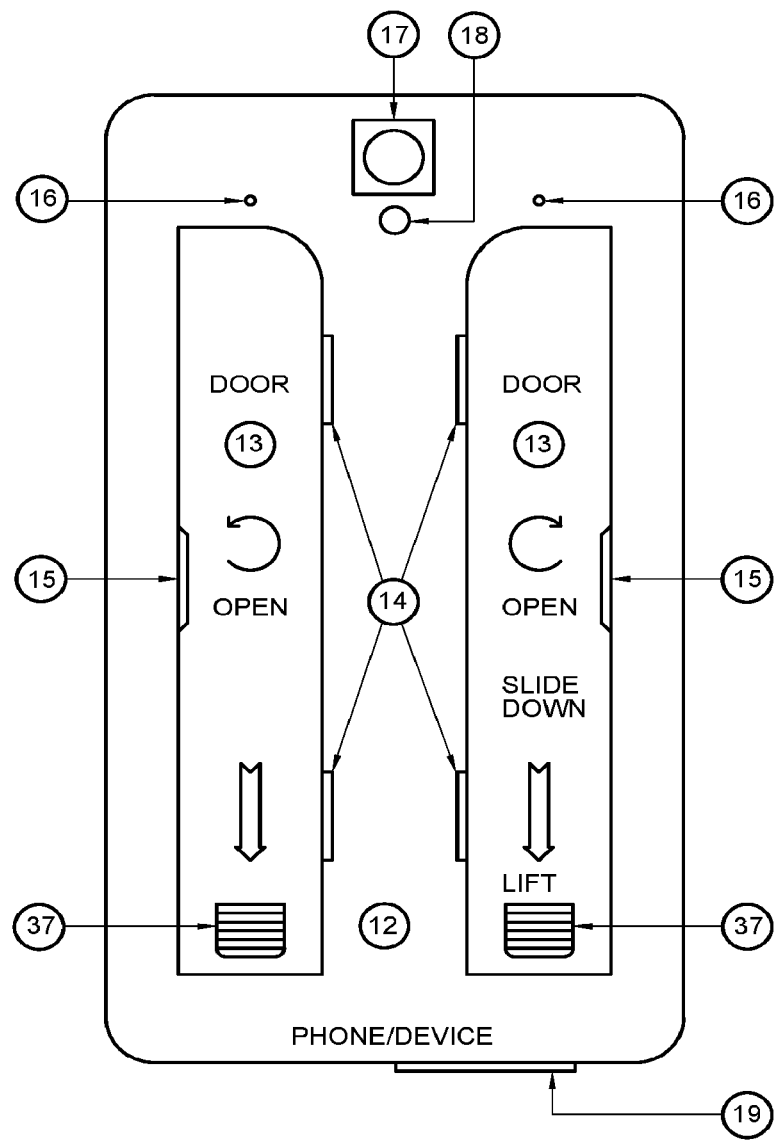
FIG. 2 shows the rear of the phone or device with doors as an embodiment of the present invention

FIG. 2 shows the rear of the phone or device (12) with doors (13) on each side covering the Bpac and/or KSB batteries that slide down on hinges (14) and then rotate up to open, the finger slot (15) that the person opens the door with; the lights (16) on the back of the device over the top of each door (13) to show the charge state of the battery inside/under it; the device camera (17); the light (18) and sliding door (19) which conceals the barcode/optical encryption system and the device's electrical contact which is used to link it to the kiosk.

Figure 3:
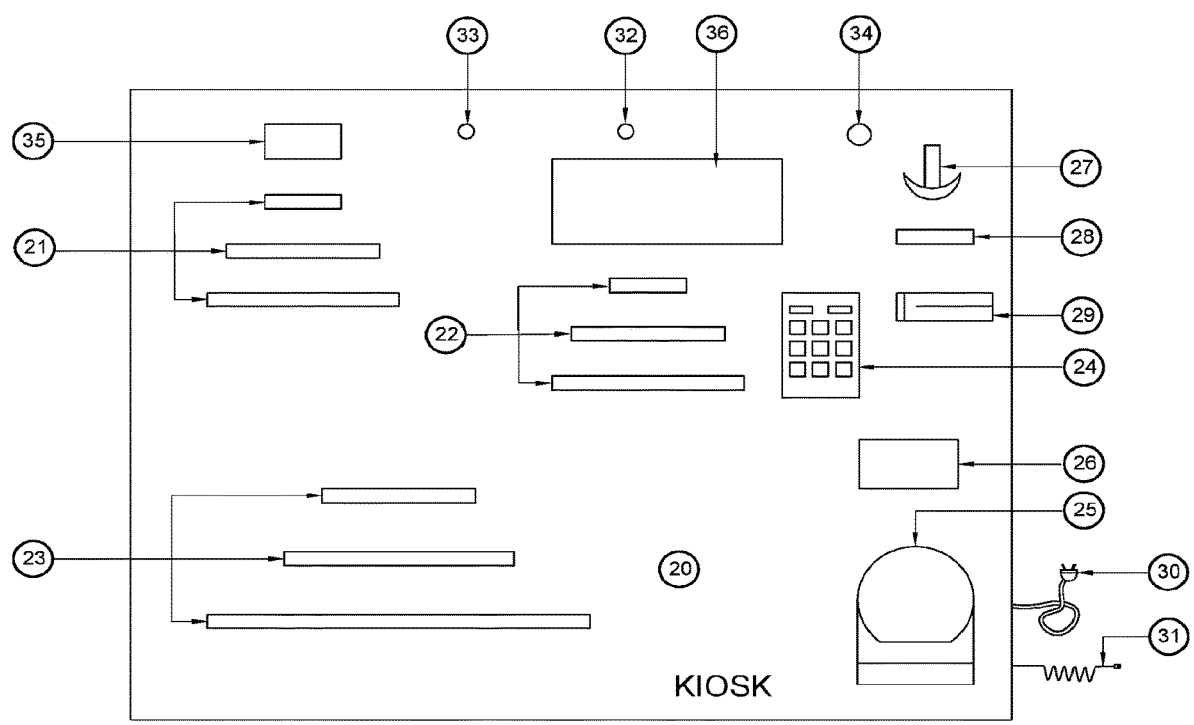
FIG. 3 shows the top part of the kiosk as an embodiment of the present invention

FIG. 3 shows the top part of the kiosk (20) (this could be bolted to/attached/set on top of an armoured containment/venting system box to vent/contain explosions. The kiosk incorporates inwards (21) to put batteries in and outwards (22) (get batteries out of) KSB or Battery slots; device slots (23) to put devices in; a touch/key pad (24); a change slot (25); contactless card touch pad (26); coin slot (27); note slot (28); credit card slot (29); electric power cord (30); phone or internet access cord (31); camera (32); microphone (33); loudspeaker (34) and contactless payment system sensor (35) for contactless bill payment; plus Video/data output screen (36).

In Diagram 2, Thumb pads (37) are also shown on the doors (13) to push/slide them down with. Base data on electrical battery reagent systems.

The Integrated Transport Solution (also known as ITS) is system for enabling the use of swappable batteries in equipment. This equipment includes cars, trucks, excavating and earthmoving equipment, tractors and agricultural equipment and phones, portable computers and telecommunication devices. The technology can also be used for supplying and recharging swap batteries used in domestic and industrial situations and fixed use applications where the batteries may be placed into the use site by other means. The technology controls access, denial of access and power going in and out from the battery. This ITS system per se is disclosed in PCT/AU2015/050767 in the name of the present applicant and is incorporated herein by reference.

The present invention relates to a system for enabling electrical devices for use in equipment including vehicles, excavating and earthmoving equipment, tractors and agricultural equipment or smaller devices such as mobile phones, telecommunication devices and portable computers to exchange either their battery or the reagents that provide the energy in the battery with new recharged batteries or reagents.

Furthermore; the present invention relates to a system for billing authorised electricity providers for any electricity sold to ITS device users so that the ITS representative in any nation receives a proportion of the electricity charges payments (power supplier pays ITS their portion of fees) Electricity is generally generated by a chemical reaction in these processes Chemical Reactions take the form A+B goes to C+D (+release electricity). Reversing the process can in most cases occur with the input of electricity Chemical Reactions often require specific conditions to be productive and safe i.e. specific Catalysts (Inc. Enzymes), specific Temperature, specific Pressure, specific chemical profile or medium for the reaction.

A or B are known as reagents.

C or D are known as products.

Reagents and reaction mediums are compounds or ions.

Regents and reaction mediums can be in solid, liquid or gas states.

Ions are stabilised by compounds known as substrates.

Reagents can be carried into the reaction by another solid, liquid or gas to form a mixture.

Mixtures can be classified into 3 types: suspension mixture, colloidal mixtures or solution.

Suspension mixtures are made from compounds that don't mix together and will precipitate solids (i.e. sediment). In STI if mixtures are used stirring and agitation systems will be used and built into the reaction point to keep the mixture mixed.

Colloidal mixtures are made from compounds that don't mix together and will not precipitate solids because the solids are not large enough.

Solutions are made from compounds that do mix together.

The dissolved chemical is known as solute and the dissolving chemical is known as the solvent.

Solute in this example is the fuel being reacted.

Solid reagents in a gas delivery system are known as aerosols.

Aerosol is a Colloidal mixture of solid or liquid particles in Gas.

Solid reagents in liquid delivery system are known as suspension, colloidal or solution.

Solid reagents in solid delivery systems are known as suspension, colloidal or solution.

Liquid reagents in a gas delivery system are known as aerosols.

Aerosol is a Colloidal system of solid or liquid particles in Gas.

Liquid reagents in liquid delivery system are known as suspension, colloidal or Solution. Liquid reagents in solid delivery systems are known as suspension, colloidal or Solution.

Gas reagents in a gas delivery system are known as solution.

Gas reagents in liquid delivery system are known as suspension, colloidal or Solution, Gas reagents in solid delivery system are known as suspension, colloidal or Solution.

For easy understanding since the present invention is primarily about control of the substances/reagents/compounds and its delivery system the reagent types will be grouped together as categories defined in the delivery systems used and will be known as either solid, liquid or aerosol and/or gas (which includes both) reagents. Thus by way of example: a gas reagent in a gas delivery system is called a gas reagent; and in a liquid delivery system it will be known as a liquid reagent. For this specification reagents delivered in liquids will be known as solute (s) and that will include either liquid reagents, fluids or solution(s) irrespective of their chemical composition.

Chemical Processes reach a rate limiting step when the conditions to drive the reaction are no longer present.
i.e. Reagent concentration below threshold
Reaction medium concentration below threshold
Catalyst surface area reduction below threshold
By-product concentration above threshold
Pressure or Temperature variation
Battery Impedance (aka resistance)

Any Replaceable or Consumable Hardware that promotes restoration and/or enhancement of the power sources' electrical supply/potential if required could in ITS be utilized and the product used and replaced in the reaction with the 'anode cartridge swap system' that utilizing cartridge technology designed for providing discrete packs of enzymes/anodes/cathodes etc. to the reaction.

Any item that promotes enhanced power utilisation can also be used and removed/replaced with the cartridge package system.

The ITS inclusions/processes

This system is about the handling and billing systems to ensure that this (the aforementioned) is all done and that satisfactory payment to the supplier parties is achieved. A key to the technology is either packaging reagents such as enzymes, anodes; gases etc. in sealed systems in order to ensure their integrity or having control over the delivery, retrieval and internal use systems to ensure that the reagent is kept secure and uncontaminated.

The means of doing this include methods for controlling and monitoring the flow of batteries or reagents into and out of the system. Placing replaceable items like enzymes, anodes, catalysts, etc. into sealed cartridges (called "anode cartridges" in this specification) each having inbuilt computer control system (CCS) processors on the cartridge so material (or anodes or cathodes) can be placed into and removed from the reaction chambers (or 'A' Points) securely in packages to provide ongoing monitoring of their usage and integrity. The monitoring and insurance of the integrity of liquid reagents as they are put into and removed from the system and while in the system to ensure no tampering or alteration occurs. Gas cylinders if used will have built in CCS's to over sight their use can control their filling and usage.

The ITS systems operate on the basis that in liquid systems fluid can be recharged within vehicles with an external electrical charging system that plugs into the car/vehicle or transport equipment and recharges the electrical storage system in a vehicle or recycles electricity when the vehicle travels down slopes and in braking or alternatively discharged solutions and reagents can be swapped for recharged fluids. The systems take into account and incorporate the concept that at some time oxygen or other gaseous reagents (such as the 'Lithium Air' battery) could be used with the reagent being supplied in gas bottles or taken from the atmosphere.

Key point of difference between other liquid systems and the ITS liquid/solute battery control mechanism is that this ITS mechanism has total control over fluids entering and leaving the system. The liquid fuel inlet/outlet port is sealed. It has an electronic hold gate on the front of it that will only open in the presence of an opening nozzle that can communicate with the opening port in an electronically coded manner. It can be wireless but preferably touch opening so the operator touches the nozzle onto contacts on the port, with direct touch contact to contact; interface occurs and the codes are passed over; the nozzle computer accepts the codes, checks the verification and the vehicle CCS opens the port. This method is preferred to induction; wireless or non-contact systems as the port has to be in the presence of the nozzle to be opened. This is essential to prevent contaminates entering the system and tampering of fluids occurring.

The data transmitted between the vehicle and the nozzle control system, when the fuel inlet/outlet port is opened, will include details that were passed across to the opening port at the time of the last opening. The centralised control and billing computer system operates on regional/national operating codes and integrated, centralized IT and billing systems. Thus the data passed to the nozzle control system at the last filling can be retrieved and checked against the vehicle ID Number the next time the car/truck/vehicle enters a filling station.

It means the billing system can also operate in a correct manner because the computer in the pump is advised by the processor outputting the vehicle information through the nozzle exactly how much fluid has been used and/or is being replaced. The customer can increase the amount of liquid in the storage tanks of the vehicle but only fluid that has been legitimately used can be sucked out.

Nozzles have a two way in and out process. So one part of the nozzle puts fluid in and the other part sucks it out. The fluid coming out comes out of the used fluid compartment which has a separate bag liner containing it. (Both fluids can be in the same compartment but in separate holding bags so new (recharged) liquid moves out of its bag into the battery energy/release part of the battery while used fluid is returned into a separate bag on the other side of the unit. Used fluid is pumped out through pipes on one side of the nozzle and recharged fluid is pumped in through a separate pipe in the nozzle.

The air space in the tank (or bags) is filled with a completely non-reactive or inert substance. This may also be pressurised and the compartment and substance is monitored to ensure that there are no breaches in the system. It is a closed loop system. Solute is drawn off from the tank, used and then returned to the other side of the tank without exposure to outside air. Any cooling (if required) is done using a sealed system.

The inert gas is inserted by the nozzle after the fluid transfer has occurred. The gas content could vary from filling station to filling station since the internal central computer system monitors the opening codes it can also keep a file to monitor gas composition content of the vehicle but it is preferably that a standardised system of gases would be used across the network to avoid contamination of gas supplies. Thus when the vehicle enters the next filling station nozzle sensors can check and verify the gas composition.

Recharging in a non-filling station environment can only occur using an electrical connection. The closed loop sealed section of the tank has systems to remove fluid from the used section of the tank; pass it through the battery compartments for recharging and then return it to the other charged portion of the tank. The internal vehicle computer monitors how much power is supplied for billing purposes.

The vehicle computer communicates to the nozzle how much energy has been taken from the fluid since the last recharge; how much has been used from the liquid bags and how much has been internally recharged in the system either using solar or grid power supplies so that the customer can be charged correctly for energy used.

Battery Swap Systems in Phones and other devices A key feature of the ITS system is the computer control system in all batteries (in some cases this is just a computer chip). A key feature of this battery computer control system (CCS), and the corresponding charge station control system, means one can know where the battery is at all times and hence can run a swap service. This means that the ITS system can track charging of all batteries no matter what the method used to recharge the battery. This enables a business model of charging for the energy used in batteries regardless of the mechanism used to supply the energy.

It is of particular importance in systems for utilizing mobile phone and other electronic devices; (the 'device'). Batteries for use in the devices can be swapped at or in reception/shop type processes or using automated self-service kiosks.

Kiosk swap batteries (KSB's) can be changed (and charged) in kiosks. KSB's can also be charged in the device on a home or vehicle charger or separately in a charge station which has a number of sites to take spare batteries. Customers can buy more batteries that either integrate into the network (KSB's) and so can be swapped at kiosks/shops etc. or non-integrated batteries (NIB's) which cannot be swapped and only work in the device or the home charge station. Emergency situations would be covered by people being able to lend each other swap batteries. The device the KSB is visiting would note the ID code of the device the KSB came from (the KSB CCS would supply this) and could require an activation code supplied by the person lending it. NIB's would still have a chip/computer device built into them. It would have numerous purposes. One would be to identify to the phone that it is an authorised battery. The phone company would issue such batteries with a ID code and activation code so the customer would be able to buy NIB's batteries from a supplier and then insert them into their phone. If the customer wanted to activate the battery, they would go online where they key in the device ID or alternatively the device would identify itself to the company website; the ID of the NIB would be checked and the activation code then entered to link that battery to that phone or device for use. (Alternatively when they buy a NIB from a Kiosk, the kiosk computer automatically inserts/supplies this code information to the device computer, contacts the network and authorises the use), There are various reasons to do this; one is that uncompliant or non-authorised batteries may damage devices.

Home chargers need to be able to either: 1. integrate into the network which operates within the electric provider's network and thus the home charger has a computer control system in it which identities it as being linked to the customer's account; (or multiple devices/accounts for an organisation or residence) so battery packs (batteries with the ITS control system are called battery packs (Bpacs) or KSB's) are able to be identified and confirmed as belonging to or being issued to that device (s) or account or else 2. Operate on a standalone basis.

Electricity provided to the ITS enabled battery packs can include:

1. Mechanisms where an ITS enabled home charger is used and the customer pays usage fees and recharge rates according to the licensed procedures. The charger, when installed, identifies itself to the network and power company computer (using protocols that talk over the powerlines). The network identifies if a battery pack is being charged or the resident battery in the device. Resident batteries are charged at normal electricity rates; KSB battery packs at KSB rates; spare NM's batteries that the owner buys that are not swap batteries and are considered resident batteries in the network procedure.

2. Alternatively, the computer control system in KSB's monitors electricity usage in the KSB so that if it is charged in a non-ITS enabled (standalone) charger or one not connected to the electricity network; the KSB records how much power is used and how many times the KSB is recharged. When the customer takes the KSB back to a vending machine/kiosk or service station the computer control system advises the kiosk or customer reception of the number of recharges which have occurred and the customer is then billed for them.

The kiosk located in vendor sites will be of different dimensions depending on where it is installed. A counter-top or floor-standing kiosks will be available. A kiosk has a minimum of 3-4 battery slots so it can take small, medium and large batteries; an on-board processor/computer; a power lead to plug into the power point; a slot for receiving coins plus one for notes; a card reader/key pad as required; a contactless payment sensor; an outlet for change and positions to put the devices into so its unique identifier can be read and integrated. Integrating is important since the network needs to know which device the battery is coming from and which battery it is releasing to that device so the unique identifier is important. The device slot will have a clamp to hold it while it is being checked and a steal in mechanism, like that on ATM's, to capture stolen or illegal devices. This means when a device is placed in a kiosk if it is stolen or police have issued an order on the device it can be held.

The battery swap procedure is to remove the ITS KSB battery pack from the battery slot in the rear of device (which is concealed behind a door) and replace it with a fully charged battery/KSB. The preferred order of operations is kiosk computer system first checks the KSB barcode; if all is in order it requests the device to be put in the device slot; it then checks the device's unique identifier and integration license with the barcode/encryption identifier before linking with the electrical contacts on the device (if everything is not in order with the barcode etc. it will not link electrically). It then links with the battery control system in the KSB with the electrical contacts and checks everything is in order before doing the swap (Device owners pay an annual or biennial license charge to be on the network if this is due the money can be collected by the kiosk along with extra deposits). Device owners also pay a deposit to cover extra. home charging on non-linked charging systems. The chip on the battery tracks its movements, ID, phone use and charging so if someone charges it on a home solar system the battery pack knows and can advise the kiosk for recovery of extra funds etc. and remove this money from a deposit. If all is in order it (Kiosk) removes the battery pack (BPac) and puts it on a slot to recharge it; requests the customer pay for the new one and then issues the new BPac. The whole procedure should take less than 30-40 seconds.

If the customer wants to buy a new swap battery, they can from the machine. It knows their device's unique identifier from it being inserted and hence has their license details on file already. They can pay the new battery fee and buy both NM's or KSB's with card or money. The kiosk integrates directly with the central network computer. Buys power in bulk from a licensed provider thus license fee splits between the vendor site; power company and device provider's can easily be achieved.

ITS lets the company owning the main operating license to include different device suppliers. The operator can choose to allow a portion of the license, swap and electricity fees be paid to the company that made the device. This encourages them to build devices and to supply and use BPacs that integrate into the swap network.

Kiosks will have mini warehousing systems inside them which stack the used BPac's in right sized piles; moves the batteries to the charging slots for charging; removes them from the slots and stacks them in correct size stacks for use/sale when needed. It is obvious that certain times of day have higher demand profiles than others so this whole process is automated and run by the kiosk internal computer so as to ensure batteries are all charged and available as/when needed. The kiosk processor can send reports to the operator, network operator or their printer if required. Note: Kiosks can sell KSB's and brand new charged NIB's but cannot swap NIB's. The swap battery has holes in it which the poles of the device slot into. The poles are sealed into the device so that in event of moisture being present it does not enter the device. The battery holes have sealing rings around them so that once they are in position the sealing ring prevents any moisture entering the battery or KSB. The computer control system (CCS) on the KSB contacts a contact either underneath the battery or on one of the device pole contact sites or on an extension/protrusion of the battery (KSB) so that it can upload and receive information. All extensions and contact point/poles are sealed into the back of the device and/or battery to prevent moisture entry and have a rubber/plastic sealing ring on the outside prevent moisture entry into the contact area when the KSB or battery is in position. Poles may have multiple contact points; so each pole may have 2+ contact sites which are separated by insulating material and align with contacts within the device/battery holes and so can receive/transmit power and/or information. The batteries may also have a pole for contact sets in the middle between the 2 holes or alternatively a third hole with a third pole in the device to handle communication transmissions. The device has one resident battery which is inbuilt and one or more swap batteries. The swap batteries are stored in receptacles on the rear of the device and covered by doors that open, close and lock. In one design the door its pushed down with the thumb (and has thumb grips/pads on it) and then opened on a hinge. The door opens and closes to receive the battery/KSB. There is a light on the back of the device above the door of each battery/KSB. This light shows the state of the battery beneath it—Green is charged, yellow part charged and red is empty. The device runs down the batteries in a set order which is normally; KSB first; second home charged swap battery and resident battery last. So swapping a KSB will top up the device's charge. KSB battery units may have an extra pin between the main pinholes (each battery normally has two pin holes although there can be more) to allow devices and chargers to easily recognise the types of batteries. A hole on the device will take the pin if the battery is installed. This can have recognition type contacts built in. This pin prevents the KSB being fitted into a non-KSB charge place.

Ways to Allow Emergency KSB/NIB Electricity Access

The battery swap process will allow parties to borrow batteries to make emergency calls. So a party may need to phone home in an urgent scenario. The KSB owner (owner party or OP) wishes to lend the borrower a KSB for 10 minutes. Protocols will exist to allow this. in an emergency KSB's will be allowed to operate in any phone for ten minutes. After this they will require an access code. The KSB when first allocated to the owner party phone will ask the OP for a 3-7-digit number. This is the EAC (or Emergency Access Code) it allows the KSB to be used in the borrower's phone up to 30 minutes.

If the OP phone owner should choose to loan the KSB out to the borrower for an extended period, then a loan arrangement is entered into the OP and borrower's phone. Devices will have an EAC Application (App) on them The OP will enter into the EAC app on their phone. It will request the phone ID number of the borrower's phone which either can be visible on the outside of the phone or on the inside of the door where the KSB is stored in the device. The app has the CCS record this in both the OP device's processor and the processor of the loan KSB. It then issues a 7-10 digit code which the borrower must enter into the EAC borrowing app in their phone when they install the borrowed KSB. This then initializes the KSB to their phone. The transaction is recorded the next time either phone uses a kiosk or connects to the internee and the App makes a connection with the central billing system; with the difference that if the OP uses the kiosk the kiosk will notify them that the transaction is recorded and they are liable to pay any, borrower's expenses if the borrowers do not do so themselves (out of the OP phone's deposit. If the borrower uses a kiosk it requests the KSB be inserted into the kiosk and it is the kept by the kiosk which notifies the network computer of the battery's return and any extra charges due from the OP's deposit. The network then issues a new KSB to the OP on their next kiosk visit. Alternatively, the borrower may elect to pay any expenses incurred themselves to the kiosk immediately or out of their own phone charge deposit.

KSB's could be coloured different colours to designate the different countries they are used in. NIB's could be a different colour or white.

The KSB owner will report lost KSB's (or NIB's). If recovered the Kiosks will process a $10 reward to people who return lost KSB's to kiosks. The OP's will be notified of its return; $10 will be taken out of their deposit to cover the reward and they will be free to draw another KSB anywhere else in the network.

Security and Device Capture Systems

Devices have a port or contact set on a side which can communicate by touch with the kiosk. This contact set is hidden behind a sliding door that will be opened to allow the kiosk to contact the contacts. The contacts are embedded in waterproof material/rubber to ensure that no moisture can enter the device. Alternatively, communications can be wireless; but the preferred method is touch. The lithium ion battery employed in most devices can be exploded in the right circumstances. This generally involves shorting the device in the right way. The possibility of this happening may be real in a swap kiosk. The kiosks are manufactured in a secure way to ensure explosions are contained as much as possible within the kiosk. They are also designed to vent explosion to the rear so that they don't hurt surrounding people and are constructed from Kevlar or bullet proof material. They will be bolted to the floor and wall they are positioned against. Venting space will be left at the rear; vents will be employed to direct any explosive gases to a safe area.

Protocols will also be programmed into the batteries' CCS so that swappable encryption can be used (i.e. replaceable at set intervals) so the central billing network can change a battery CCS's encryption at any time (or at regular intervals) so that any tampering of the battery may be detected prior to any electrical connection being made of the battery to the main kiosk computer. The customer device should be entered into the kiosk machine first then the KSB. The customer will have pulled the KSB out separately before placing the device in the machine. The KSB will enter/be placed into a cradle of the appropriate size slot in the kiosk. A clamp takes hold of the KSB with/on the attachment cuts/slots on the side of the KSB and takes it into the kiosk. Once in the machine the KSB goes to a verification site which is a place where the barcode, or Q-Code is read. Where barcode is mentioned in this specification means any physical/optical encoding scheme such as Barcodes, Q-Codes, encrypted images etc. The barcode is positioned under the KSB/NIB in a groove/crevasse built for it. The purpose of the groove is to stop damage to the barcode in the event that it is not in a device at the time. The cradle and clamp hold it first over the barcode reader. The Barcode reader reads the barcode on batteries/KSB's before any electrical connection or network connection is made and compares it with a 'wanted' list. The 'wanted' list consists of all the devices and batteries issued to devices and persons who authorities or the network administration have decided should not be supplied with devices. After the barcode processor is satisfied from the barcode read that the KSB is safe; the cradle and clamp then slide the battery onto the kiosks poles and contact sites so the KSK/NIB can communicate with the kiosk CCS. If the device or KSB is on the wanted list; the machine takes both the items. The device will be placed in a secure bomb proof/damage minimization drawer. Similar drawers will be available for KSB's in the kiosk. The kiosk will notify the network and authorities of the equipment confiscation. These drawers will be built from Kevlar and armoured metal and lined with plastic or rubber material; the purpose of the rubber is to prevent any electrical shorting of power supply on the confiscated equipment.

The draws containing confiscation boxes would have keys which the relevant/police authorities have keys for and can remove independently. Kevlar lined/armoured bags or boxes to remove and transport the draws/boxes in would also be given to authorities. In event of any danger occurring the kiosk would sound an alarm and notify person to evacuate the area to the outside. In order to keep the first contact to batteries separate from the main processing system Barcode readers/first contact processors (FCP's—there will be more than one so that there is built-in redundancy) will do the initial read and electrical contact. They can and will then be isolated if there is any risk to the main Kiosk computer. The purpose of the initial processor is to verify (once the barcode reader has done its job) that the chip (CCS) in the KSB has not been tampered or interfered with. High level encryption protocols (which can be changed on a regular basis) will be in place to ensure that CCS chips are not tampered with but if they are the battery will be immediately confiscated and placed in a containment draw. Once satisfactory verification is made and payment accomplished a charged battery is issued and the discharged KSB is transferred to a charging site.

This process would also be used in the vehicle swap operation so that the robot that does the swap would, prior to swapping the unit, check its barcode with a reading device and then if the battery is on the endangered or wanted list remove it and place it in a secure storage place for removal by police/authorities. The machine would also notify the reception of the service station of the risk of removal of the endangering battery so staff can institute evacuation procedures if required.

Kiosks will be equipped with a microphone (mike) and Digital camera. Scenes in front of the machine will be recorded and stored for later use if required. There will be a 'black box' system so that a USB or other storage device will record activities and transactions including confiscation of KSB's. This 'black box' is housed in a secure 'black box' container made of suitable material to sustain blasts or other damage and a second redundancy black box will be secured in a place outside of the kiosk Kiosks have vents to allow any explosions to vent out through the back and sides of the machine away from people. Preferably kiosks will have a venting system that can let explosive gases escape through holes in the rear wall of the premises it is in. Alternatively, in something like airport terminal the kiosk will be in a position where behind its back there is a secure open space area contained with 2+ meter high partitions that can stop any blast and transfer the force upwards to the air.

Kiosks will be made that can stand alone outside premises; so they will be weather resistant. The explosion control system in them will vent upwards and to the side (above head height) so as not to cause harm people.

Until the dangers presented by Lithium Ion batteries are overcome batteries will be of such a size that their blast potential is limited to within set parameters. Thus the KSB's will not be so large that if an explosion did occur in a kiosk the venting system could not contain or manage it satisfactorily.

Kiosks have multiple explosive systems so an explosion is staggered; it has to breach one level of prevention containment before reaching the next and then eventually the outside or open space behind the kiosk. Kiosks are bolted to the wall behind it and to the floor. Kiosks also have fire containment systems and extinguisher built in along with the ability to independently notify both the network and relevant authorities. The barcode reader reads the barcode on batteries before any electrical connection or network connection is made.

International Kiosks international Kiosks will be located at airports to enable the swapping of local KSB's for overseas or international ones. It is envisaged an international KSB could be provided to travellers going to multiple destinations. KSB's in each region are likely to be supplied by a regional party so in the US there is a company that supplies US KSB's similarly there will be one in the UK; EU and Oceania. These groups can in consortium issue say a white with blue striped. KSB that will work in each of their regions. The business traveller or other would be able to use an international Kiosk to change their e.g. UK or Oceania KSB's to US KSB's prior to getting on their flight. Kiosks would have supplies of international and national KSB's. They would take the UK KSB's off the traveller and issue US ones instead. The new ones would be charged already and when the traveller gets to their destination they would at the first swap over pay a deposit into the US Kiosk machine to cover the use in that nation.

Optical encryption devices include means of breaking numbering up into geographic region; device type and device ID number. So for example using a barcode the first field could allow 9-99 regions; the second field 9 devices; the third field 9 billion ID nos.

Lithium Ion—Dual cycle Battery

The problem with the Lithium Ion battery is that it builds up layers of lithium on the electrode which then slough off as the battery heats and cools. This creates a problem in that this sloughed off material forms a barrier to electrons reaching the electrode and hence the effectiveness and usage life of the battery is affected. The problem is repealed by having an electrolytic solution of lithium polysulphide solution interposed between the electrode and the rest of the battery. This process is specified in other material that others have published.

This has two other effects which this process will be able to incorporate:

It cools the electrode which in doing so minimizes the lithium separating from the electrode; and secondly it dissolves the lithium that has sloughed off back into solution and then redeposits it on the electrode at the appropriate part of the recharge cycle. Having the anode in an electrolytic solution also means that any slough off that does occur does not affect the working of the battery unduly as the electrolytic solution provides a conduction medium between the rest of the battery and the electrodes. Other suitable electrolytic solutions may also be used to interpose between the electrode and rest of battery.

Another advantage of having a fluid partially inside the battery is that it can be passed through a fin cooling system on the outside of the battery which has air flowing over it thereby reducing the heat inside the battery. In this manner battery cycle life can be increased. ITS vehicle will provide cooling systems as required under the control of CCS processors.

Placing a filter in the liquid circuit may enable the electrolytic solution to be filtered to remove insoluble particles that stop or impede the contacts working properly.

The Two Solute and/or single solute ITS removal and replacement battery technology The term 'solute' used in this specification to mean any fluid or liquid, solution, solvent, slurry, including suspensions, gases and aerosols when used in this context for producing electricity, Hardware solutes, colloidal mixtures, catalysts including consumable hardware or materials that promotes partial or full renewal of the potential of the battery electrical.

Authors note: The word 'solution' could have been used however this has another strict chemical meaning so for ease of understanding 'solute' is used in this context to cover this listed meaning. The purpose of the system is not to reinvent the liquid battery or flow battery systems rather to implement a billing system and design a process so that fluid will be able to be reused; removed from the battery or vehicle re-energised and returned to a vehicle to repower it. The concept of removing the electrolyte will enable fast re-charging of vehicles without having to sit attached to power cords. The solute is instead removed and recharged and the speed of solute transfer is only dependent on the speed of liquid replacement rather than the speed of electrical recharging. Electrode replacement may also be required in the process and this is catered for with the 'Anode cartridge replacement system".

Batteries generally work on the concept of electrons moving from one part of the battery to the other during the discharging process. The movement creates current. So in the end state of the two solute battery with two separate solutions in separate containers has in the charged battery the electrons on one side and in the discharged battery has the electrons on the other side. Single solute batteries move the electrons and ions to or from the electrodes and into or out of the solute. Thus with a single solute system the electrode (s) is either increasing in size or degrading into the solution.

All types of liquid protocol dual and single solute battery systems and solutions can be used including but not limited to:

Alkaline including systems by Daniell; soluble halates;
FE-C flow; Vanadium Redox flow; redox flow; Harvard university's quinone system;
Lockheed's ferricynide alkaline flow battery system; lithium air as well as other types of 'air' batteries; lithium polysulphide systems;
lead acid either single or dual solute;

The two solute battery works on the same principal in that the electrons move from one side to the other. It has separate solutions in separate containers which could be separated by a membrane. In this case however the solute is the medium of storage for the electrons, so the electrons in a fully charged format are on Side A of the battery and in a discharged format on Side B. (The solute in Side A is different to the solute in Side B either in chemical combination or the state of the ions (in the membrane style system) and hence can be described as Solute A and Solute B respectively). The electrodes on Side A of the battery interface with Solute A and the electrodes on Side B interface with Side B. The electrodes on Sides A and B then interface with and provide power to the two different +ve and −ve terminals of the battery respectively.

The battery works by a fully charged solution of Solute A and Solute B being put into the respective sides of the battery. The electrons then move between the different sides as the battery is used. It reaches a discharged state when all or a critical number of the electrons have moved from one side to the other. The solute is then removed from each side and separately stored in separate facilities.

The battery can then be recharged by putting new batches of unreacted fully charged liquid in each side. (Note the system could use gaseous or solid material in place of the liquid solute on each).

The used solute is then placed in a battery somewhere else where the process is reversed and power is supplied so the solute on each side returns to its previous fully charged state. It can then be returned to the original battery to fully re-charge it. in this process the solute is the only thing being replaced (along with catalysts, electrodes, membranes and/or enzymes etc. as and if required). The storage material and systems that hold the fluid in the vehicle are not changed or removed.

The two sets of solute A and B would be stored in compartmentalised systems so that charged solute is kept separate to discharged solute. This system might incorporate two tanks for each type of solute (or in a single solute process one tank for charged and one tank for discharged liquid). So, a compartment initially has charged solute in it. It is emptied into the battery system and the tank is empty. Alternatively, the storage system may incorporate a two bag system so that unused solute is stored in one bag that initially fills the space. This is withdrawn into the battery to provide electricity. The other bag in the compartment is then filled with used solute until the space is fully refilled with discharged solute. So the same compartment can be used for both sets of each type of solute ('A' or 'B') but either bag in the compartment either has only charged or discharged solute of one type in it.

So a compartment has three states—empty or filled with charged or discharged solute. The battery (in this process the thing known as 'the battery' is an array of electricity release and recharge systems made up of small separate interconnected/interlinked modules) has numerous activation points ('A' Points). 'A' Points require tanks for Type 'A' and Type 'B' solute (or one tank in single solute systems) and the electrode system. Solute packs (each of the packs are one set or charge of both Type 'A' and Type 'B' solute) start in a charged state and end in an empty or (discharged) state. In the process the voltage goes from high to medium to low levels. In order to maintain a set voltage from 'the battery' a series of 'A' Points is used so that as the charge in one 'A' point's solute package falls it is averaged with power from other solute packs in other 'A' Points to provide an average stable voltage. This process is automated so the power generated from each 'A' point's solute package is released into the system using a software controlled automated switching system so the power provided by any one of the activation points and associated solute packages is able to be inserted anywhere into the series of cables (under the control of the automated switching system) leading to the main cable thus providing a stable outlet of power to the battery output terminals.

Thus the system uses the output of a number of 'A' points. It also measures the power outputted; controls/monitors the charging and discharging of Type 'A' and Type 'B' solutes in the 'A' points and activates the switching in order to deactivate an 'A' point and switch out the old solute and refill it with a new solute package. Enzymes, catalyst or membrane replacement might be required with/using some solutes; if necessary this will be done with the Anode Cartridge Replacement System mentioned in this brief where anodes, or cathodes or cages or mesh/filter type packs or different cage or carrier systems containing enzyme/catalyst etc. or membranes can be removed and replaced out of and back into a cartridge package as required.

Some solutions have colloids or suspensions or mixtures as the liquid reagents and thus a by-product of the reaction is a deposit of substances that come out of solution and deposit on the base of the activation point or container holding them. Such deposits need to be removed during/at the time of solution swaps and hence in this type of reagent a removable base, container or draw is built into the 'A' Point which can be removed along with the sediment deposit at the time of swaps. The container may require flushing which can be done at the same time. The suspension may also require constant agitation or stirring. The 'A' point will have agitation and stirring systems when required which are all under the control of the CCS. Container swaps along with enzyme and anode replacements etc. will be controlled by the CCS controlling the systems. At the time of fluid replacement in a service station these substances together with used solutes and anode/cathode cartridges are removed from the vehicle or equipment and sent off to the factory/depot for rejuvenation, reconstitution or recharge.

Thus the CCS/IT system is able to disconnect an 'A' point and order the solute in it to be pumped out into used compartments (used solute tanks); the container draws etc. to be replaced and the new solute to be pumped back in the empty compartment out of fresh solute compartments to refill the 'A' point, (note: used solute is kept in empty or used solute tanks/bags it is not mixed with fresh unused solute). The IT system also monitors and regulates the temperature, pressure and other variables of the reagents in the 'A' points to ensure the system operates within required parameters. The IT system continuously monitors the other compartments to ensure that no unauthorised reactions or events occur and reacts if necessary to rectify any such situations. The 'A' point and power switching system is needed as there may be 7 or more power output entry lines (A to G) into the main out power circuit. If an 'A' point is outputting power into Entry Line (EL) A and its voltage output drops so its power should be going in at EL 'E' it needs to be disconnected from EL 'A' and put into EL 'E'. At the same time if something else was inputting into EL 'E' then it needs to be either routed elsewhere or turned off. Thus there is a constant system of monitoring required to ensure optimum power output is achieved, the IT control system also prevents backflow of power in lines where the voltage is dropping as a package runs down on power. Thus as voltage drops in an EL the power coming into the line is switched to the appropriate incoming line for that power output.

Contaminants Linked with Redox Reactions

Redox and other reagent systems may build up quantities of unwanted by-products or contaminants from reactions. In time these could reach a level where it impedes reactions. When these types of fluid are removed during a replacement it will initially go to a storage tank where the reagent and other chemical levels will be tested before it is released to normal storage. If the contaminant level is to a stage where it should be removed, reactants will be entered into the solution to precipitate out the contaminant by-products so they will be able to be removed out for recycling or disposal.

Recharging is the reverse of the process with the power being inputted into the 'A' point to cause the reaction to reverse with the solute moving back to a fully charged state. As this recharging process takes time there will be a sequence of 'A' points dedicated to both powering (outputting power) and recharging solute with power coming from either downhill running, braking etc. or an outside source such as mains. So in for example in a 10 'A' point array; 7 of the 'A' points may be output points and 3 may be recharging points. Output points generally will always be used to output but the CSS may cause an A point to switch to recharging if required in order to build up its anodes if they are worn down or anode swaps are not available, (Recharging sometimes causes solute to precipitate material out of the solute onto the anode). Discharged solute will be fed into the recharging points in the same way as other points receive charged solute. Once the solute has been recharged it will be pumped back into the fresh solute tanks and more uncharged solute recycled in. Dedicated recharging points means that a vehicle for example going downhill may be recharging at one 'A' point while at the same time drawing power for other uses from another 'A' point. It means the discharged solute can be fully recharged before being put back to use. The solute in various applications could be stored in containers that will be able to be removed in and out of the vehicle or aircraft. It is possible therefore to swap solute containers on something like an aircraft which can then swap its containers again at its destination. The solute containers can be removed from the train, (trains could have a whole carriage built as a container) aircraft or vehicle. The solute can then be drained from the used solute tanks or be recharged in the tanks (with/using used insertable anodes/cathodes) and/or this can occur somewhere else.

Aircraft may carry solute in tanks in the wing. The solute tanks are designed to provide spare storage capacity so that when the solute is spent it can be stored in the excess capacity while fresh solute is sent to the 'A' point. Spent Solute is able to stored in the same tanks that were used to store it before it was used (using a bag liner type system) with the stipulation solute is only able to be stored in tanks or bags specified for that type of solute so Type 'A' should only be in type A tanks and Type 'B' in Type 'B' tanks.

For vehicles, such as aircraft and ships, where load balancing can be an important issue, there will be an ability to pump solute between tanks in different locations to maintain the equilibrium of the vehicle. A computer control system will control the pumping of solute between tanks with a user interface panel that will allow a pilot (or other competent individual) to indicate how to change the distribution of solute between tanks.

Hybrid systems are possible for vehicles that require large releases of energy for short periods of time. For example, aircraft taking off or coming into land, or trains starting up or going up a steep grade. Conventional electric systems could be used in combination with a battery system such as the standard ITS battery or a one or two solute battery system. Systems incorporating dual storage systems such as capacitors (or lithium ion batteries) beside/as well as the normal batteries could be used to hold an build-up of extra power generated on an aircraft for example during cruise (when it is not normally needed) so that it would then be available for take-off or landing requirements.

The same processes used for solutes could be used for handling/with an aerosol system for the reagents, 'air' battery technology may require the reagent to be delivered in a gas mixture. The storage and exchange mechanisms to cater for an aerosol delivery system would differ in minor details. The general battery management and energy delivery process would be the same for these types of battery systems as those described. One exception with 'air' batteries would be that those that utilize reagents (e.g. oxygen) out of the atmosphere. In this situation the quality of the reagent may be contaminated with chemicals from the environment. Obviously filtering of air will be required as will monitoring of the source and output of the filter prior to involving it in the reaction. These processes would be controlled by the vehicle CCS. In certain circumstances the natural environment will be too polluted to use in air batteries in which case the batteries will need to be switched to cylinder based gas supplies. In some circumstances whatever the cause, use of 'atmospheric sourced' regents could cause contamination of the other reagents. As these other reagents will need to be removed and reused; the use of such systems would require a post removal testing/rehabilitation system in the same manner as that used for/in contaminated redox reagents.

Air Trains and Other Applications

One of the easiest methods for using this technology in an aviation context is air trains. The main costs in aviation are fuel and pilots. ITS makes electricity cheap in replacing gasoline. Drones remove the need for pilots in the correct circumstances. One such situation would be air trains. They are not really trains but they act as such. It is arranged to fly over a set course on top of/to the side of the an existing railway line or road. Because it uses electric engines noise is lower. Tests show that craft using electric engines use less fuel. Thus a 15-20 or maximum 30 seat drone could easily fly safely a set route on top of the railway. If the aircraft went at 140-240 knots it could travel 50-70 km in less than 25 minutes. Short take-off and landing strips 200-300 m long would be used with the craft needing 100-130 meters. Along the side of the railway emergency grass landing strips would be located at 7 km intervals. The drone would operate in a shuttle so every 10-15 minutes one takes off. There is a flight controller at each stop who oversights the loading and unloading and take-off before hitting a switch that allows the next drone to land. One set could land on one side of the railway and those going in the opposite direction on the other side. So they fly one way on each side.

ITS systems mean they could swap batteries or solute during 5-10 minute stops on the ground. So the craft is never in the air for more than 25-30 minutes (or 50 minutes' maximum). A combination of energy swap systems for trips and resident battery backup for emergencies situations would handle it easily. Standard ITS features like wireless intercommunication would be in place so at intervals the drone talks to a ground point which relays needed information to the stop/swap point.

Drones would only fly at 200-400 meters maximum height and because of the emergency grass strip system would always be in a position to land somewhere. The craft would carry luggage inside the cabin in the centre of the craft in storage containers over the wings. The containers would have self-balancing built in weighting equipment that notifies customers if a bag needs to be moved from one storage container to the other or one side of the craft to the other. Toilets similar. Other balancing would be setting the solute containers in places in the wings and batteries in the nose and tail of the Craft or on pods under the wings. The wheels would swing up under the craft with the bottoms just protruding so in an emergency it can land on the protruding part of the wheel without full extension. Sensors weigh people sitting in their seats. If they detect anyone moving about in the cabin (since they know their weight) the automatic flight systems can adjust for them and stabilise the craft.

Vehicle CCS for atmospheric batteries would need to monitor outside air and post filter air quality and note the presence of any such contaminants and if contamination is likely to have occurred. This information would be passed to the service centre/swap station when the vehicle presents for a fill. This patent covers the business process to work with an aerosol delivery system for the electrolyte.

'A' points will be adapted to take gases instead of liquids and systems to handle combinations of liquids, gases and/or solids will also be available. There will be a process to swap out enzyme packages as required in a similar manner to anodes swaps. So enzymes will be stored in cartridges or in wire/plastic cages and can be lowered into and removed from liquids or gas reactions as required. Other reagents will be handled in this way if required.

Security Systems

The audit process will enable the ITS system to lock out a vehicle that has used unauthorised solute. When the vehicle goes to a service station it will not be able to replace its solute or swap an anode cartridge. If the vehicle is connected to a charging point in any location it will not be able to be charged. The vehicle can be re-authorised after a service to rectify any potential damage and an inspection to ensure the safety of the battery system.

This ability to authorise and unauthorize vehicles (and cartridge or battery packs) uses the communication mechanisms described in the sections describing the CCS integrated computing system. All parts of the ITS system are able to securely communicate with each other. In a two solute based battery system there will still be a CCS computing system integrated into the battery system, as for swappable battery packs. It will have the same functionality as the system in swappable battery packs, as well as additional functionality to control the operation of the one or two solute battery or gases as required. It will manage pumping solute between the battery and the storage tanks. It will also manage replacing anodes as they degrade in performance. The computing system will monitor battery performance to determine when solute needs to be replaced or an anode swapped. This will be determined by a performance profile of the solute inside set parameters that suits each type of vehicle.

In vehicles like aircraft which require full available power for landing the pilot will be able to request a full replacement of solute and swap of anodes in all battery compartments prior to making a landing approach. They might also use a hybrid system as discussed earlier. In the context of a two solute battery system the billing system will be extended to cater for the unique aspects of this type of battery. Customers will be charged a fee when they replace an anode cartridge (or it could be incorporated into the electricity charge). This fee will cover the cost of producing the cartridge, reconditioning anodes over their lifespan and a mark-up for those in the billing chain.

Customers will be charged a fee when they replace the solute in the battery system. This fee will cover the electricity cost of recharging the solute, disposing of the solute at the end of its lifespan and a markup for those in the billing chain. If the customer has recharged the battery at a charging point (e.g. at home) they will similarly be charged. The fee for disposing the solute will be calculated based on the number of times the battery has been recharged. (The solute has a finite lifespan and each recharge reduces its lifespan. This ensures that the fees collected for the solute cover the full cost of the material.) Alternatively the fees can be included as part of the energy cost.

The sealing of the filler system;

House charging point/panel—it will not let electricity in if ordered not too; similarly with carpark; service station; office; work sites, Unless IT is authorizing it the device does not operate or charge. If there is a breach in protocols of system, it shuts down refilling and the use of vehicles. Door to the cartridge that opens to swap anodes, catalysts, enzymes etc., will all be IT/computer controlled and use protocols which refuse it to open if security identification and renewal protocols from vehicle or service centre are not ok.

The filler system; vacuum to suck the old solute into the tanks of the service station and has a. lockdown mechanism so if any part of the system within the car is tampered with the filler will not open; the used solute cannot be sucked out and reused and the car cannot be serviced or supplied with solute until it has been returned for service at a licensed premises and a bond has been paid.

Similarly, gas cylinders/suppliers will be certified with unique controlled codes in the case of where reagents which are gaseous. CCS chips will be used for cylinders to ensure: 1. The integrity of the reagent; 2. The utilization life/cylinder performance characteristics are complied with; 3. No unauthorized recharging of cylinders occurs.

Filling System—

The filler unit has a two/4/ or 5 nozzle system. Two long prongs, two short ones and additional systems and pipes/ prongs as required; (if a gas is to be inserted into the compartment a 5 nozzle system may be used where the fifth nozzle inserts gas and also has a sensor apparatus on the end of it to select samples of gas and test it to ensure it is still the original gas inserted at the last point of authorised refill), the cap stays shut unless correct protocol is in place which is ok-ed by both the equipment and service centre IT system Long ones suck out used solute; new solute is put in through short prongs; caps is IT activated; it vacuum seals to car before solute is released; additional systems to inject air or gases to the tank and sensors for checking.

The Activation and sensory system senses if unauthorised solute is used and bans/unauthorizes the vehicle which means a service centre needs to rectify the problem; remove the solute then clean and recertify the system before the vehicle can be re-authorised to use the system and network again; the network oversights filler devices and the filling system will only open at authorised sites. There is a meter on used electrolyte to insure it is fully recovered; charged for correctly and if person has used home charging on solar that fee is collected, (solar charging still costs wear and tear on battery life and on solute).

ITS Command and Security Protocols.

If the solute system is misused adding the incorrect solute to a tank) it can damage the battery system and the vehicle in which it is housed. Mixing incorrect solutes can also be potentially hazardous. It is therefore imperative that systems be put in place to ensure the solute cannot be tampered with.

The ITS control system in the vehicle will prevent misuse. The cap on the fill port will be locked electronically and will only open as authorised in the presence of an authorised filling station. A wireless technology such as NFC or Bluetooth will be used to communicate vehicle ID information between the vehicle and the filling station. Access to the fill port will be logged by the vehicle's computing system and the details will be downloaded during vehicle servicing or via other approaches (e.g. when connected to a charging point) to audit filling of the vehicle's solute tanks.

IT can turn off the car/system from receiving energy off panels in homes if they are being improperly used or if vehicle is cancelled or suspended;

If gases are being used as a reagent they will be put in through a separate filler or in cylinders. The cylinders will have ITS CCS CHIPS AND OPERATING PROTOCALS in place.

Cartridges—the "Anode Cartridge Replacement System"

Anodes, cathodes and enzymes reagents could require replacement at times. These reagents will be provided in secure cartridge format to the client. The anodes will be secured inside a replaceable cartridge that the client places or is placed robotically inside their vehicle. The cartridge is sealed by the distributor and has a CCS system on it which controls access to the cartridge packs in the cartridge and integrates with the vehicle and 'A' Point systems.

Cartridges are the container that holds the 'cartridge packs' which are cages of enzyme; catalysts or any other reagent or reaction enhancer that is used in small quantities or multiple electrodes anodes/cathodes etc. which may need replacement at times.

One cartridge may hold 9-10 packs or anodes etc. The cartridges can be round, rectangular or straight and comprise of plastic or some other durable material which is not damaged by being in close proximity to the solutes used or the chemical they carry. The cartridges can hold cathodes. Cartridges have a handle at the top to lift them out with; electrical contacts to link to the vehicle CCS with; a door at the side or bottom to allow the lever from inside/out of the 'A' point to retrieve the anode or pack through and a cover which opens to allow replacement of the anodes or packs etc. The cartridge CCS controls access to the cartridge. The door and cover are sealed and when in the vehicle will only be opened by the order of the vehicle CCS and cartridge CCS operating in agreement.

As with the operating system for accepting devices or KSB's on Kiosks, there is a barcode on the cartridge that is read by the reader on the vehicle; if that is in order an intermediary CCS on the vehicle links with the CCS (through a processor that can cut the link with no damage to the main vehicle computer system). If all is in order and the linking code is right, it links/integrates with cartridge CCS.

Cartridges sit on top of 'A' points (or can be off to the side or underneath); Cartridges have a spare space in cartridge (slot) to take the pack and/or old anode being replaced and put it in the slot; the cartridge then moves (the cartridge can rotate its outer security case if circular or move/slide along inside it if it is in a rectangular format) to get new anode into correct place to be pulled into the 'A' point. The opening to this slot is closed off with a sliding or hinged door when not in use. The owner opens it as he inserts the package into the vehicle or alternatively the closed door will require codes from the vehicle (that were provided by the service centre) to automatically open the door once it is inserted into the car/vehicle.

A Lever inside of 'A' point pushes out the old anode or pack and then catches and pulls in the new anode/pack;

There are spring (or they may be electronic) clamps inside the 'A' point and in the cartridge pack to keep anodes in place; a push rod or lever from inside the 'A' point opens the anode clamp in the cartridge to release the anode/pack to the lever (or it is released electronically) so the lever can then pull it back into the 'A' point.

There is an opening/door in top of an 'A' point to slot anodes/cathodes through; most anodes are replaced by cartridges; most cathodes are replaced in maintenance services as required (e.g. 4000 km).

A Press button release system on top of the cartridge allows it to be manually replaced. The replacement of cartridge requires it be authorised by the vehicle IT system otherwise the lock on cartridge does not release.

Horizontal placement has a ratchet on 'A' point to move cartridge across opening; There is an arm in 'A' point to control a lever that pushes old anode out into cartridge then pulls the new anode/or whatever type of package into cartridge; it is best done when electrolyte swaps occur so the 'A' point is empty of electrolyte/solute.

There is a CCS Chip on Cartridge replacement system of anodes/cathodes; It ensures only registered cartridges can be installed and removed; only proper cartridges of certified ITS suppliers are used/installed. It makes it impossible to install illegal cartridges (as it will only accept ITS certified cartridges by ITS suppliers in ITS certified service stations); cartridges will also have a spring locking system so the cartridge stays locked when not on the vehicle unless authorised by a service centre with the appropriate unlocking codes. Cartridges will be barcoded for easy automated identification. Since the network has control of the codes, cartridge opening codes can be set as unique to each cartridge; the barcode reader tells the service centre which cartridge it is before it is opened/fitted thus the right code can be sent to the vehicle when it is in the service centre or the service centre employee to open it.

Enzymes would be in packages that allow them to be inserted into the solution and then removed. Similarly, anodes and/or reagents would be singular or in packs that can be inserted and removed as required. The cartridge or 'A' point controller would open a door on the side/bottom of the cartridge to allow an anode/pack etc. to be removed out of the solution in the 'A' point by a lever or other mechanism and placed into an empty place in the cartridge and a new fresh pack would then be inserted by the same system into the solution.

Anode cartridges will make an air tight seal when connected to a battery system or 'A' Point. The battery compartments requiring anodes will open the slot/door for swapping the anode as needed. At other times the anode cartridge will be sealed so the anodes are kept away from the solute compartment of the battery. This will be controlled by the battery/vehicle computing system.

Anode and cathode cartridges on small-vehicles (e.g. cars) may be manually replaced. Releasing the cartridge is done by pressing a button that activates the electronic lock holding the cartridge in place. If a vehicle has been unauthorised the lock will not release the anode cartridge. Additionally, if a vehicle knows that it has been unauthorised it will no longer retrieve new anodes from the attached cartridge and the door on the anode/cathode cartridge needed to open to access the anodes/cathodes will remain locked. Anode cartridges on larger vehicles (e.g. trains) may be replaced by a robotic system that is similar to the robots used to swap battery packs.

Solar Power at Home Generated

Developing countries experience power blackouts. ITS vehicles are designed to plug in to a two-way charging point in the home. This point can be used to transmit power in both directions so it can be used to power the home. Vehicles can carry extra battery packs (BPac's) in their slots that can provide power in homes during power shortages or to tradespeople working on site or to other sites when solar and/or if other sources of power is not available.

The TTS licensee in an area will generally provide UTMA's and BP's on a swap basis where ownership of the LIMA and BP remains with the licensee. The fee charged to customers during a normal swap over of UTMA's includes money for the power in it plus a component for life of the BP including a battery life and wear and tear component (W&TABLC) so it can be reconditioned at certain intervals after a set amount of recharges. If a person is recharging at home using solar a deposit needs to be charged on the BPac's or UTMA's to cover the use of the battery and wear and tear caused by home recharging. In this case the computing system in the BPac/UTMA stores the data on the amount of power used both in and out during home charging and then calculates the amount of W&TABLC+ margins and orders the billing system at the triler park or service station to deduct this out of the deposit when the next swap occurs.

The formula for charging customers includes

BLC—battery life component;

B C—batt recharge component

ITS margin is calculated as a percent of normal retail electricity charges;

BFC—batt finance cost (includes cost of material portioned over life of usage plus interest on battery for life of unit or solute as well as enzymes, /anodes/cathodes catalysts plus other services/substances used).

The systems and methods are not limited to the specific embodiments described herein. In addition, components of each system and each method can be practiced independently and separately from other components and methods described herein. Each component and method can be used in combination with other components and other methods.

While considerable emphasis has been placed herein on the specific features of the preferred embodiment, it will be appreciated that many additional features can be added and that many changes can be made in the preferred embodiment without departing from the principles of the invention. These and other changes in the preferred embodiment of the invention will be apparent to those skilled in the art from the disclosure herein, whereby it is to be distinctly understood that the foregoing descriptive matter is to be interpreted merely as illustrative of the invention and not as a limitation.

The invention claimed is:

1. A system for enabling electrical devices, each having a unique identifier and electrical contacts, to exchange a Kiosk Swap Battery (KSB), including at least one of a battery, battery fluids, reagents that supply the energy for at least one of a battery, device with new recharged batteries, battery fluids or reagents, for use in equipment including at least one of a vehicle, excavating and earthmoving equipment, tractors and agricultural equipment, aircraft, smaller devices such as mobile phones, telecommunication devices and portable computers;
   said devices being powered by a KSB which can be swapped at a reception area, shop, or in one of a number of automated self-service kiosks, said kiosks being located in vendor sites having different dimensions depending on where said kiosk is located, including at least one of a counter-top or a floor-standing kiosk; and
   comprising multiple KSB positions to accommodate different size KSBs;
   said kiosk further comprising an on-board processor/computer;
   a power a power connection;
   a slot for receiving at least one of currency;
   a card reader, key pad;
   a contactless payment sensor;
   an outlet for change and at least one slot designed to receive one of said devices, a reader associated with the slot to read the unique identifier to allow tracking the device the KSB is coming from and the KSB being released to that device;
   each of said slots comprising a clamp to support at least one of a battery, telecommunication device or portable computing device while the battery or device is in said slot and wherein said computer causes said clamp to close to capture and retain the device in the slot when said read unique identifier indicates that the device in the slot is stolen or illegal;
   wherein each said Kiosk Swap Battery (KSB) comprises a battery control system, a memory chip and an associated barcode, and each said device has an associated integration license with a unique barcode/encryption identifier and a battery pack, said kiosk further comprising a barcode reader connected to said computer and wherein the battery pack is removed from said device and is replaced with a fully charged battery pack during the swap procedure, said kiosk computer system being connected to said barcode reader and programmed to first cause said barcode reader to check the KSB (Kiosk Swap Battery) barcode;
   when the read barcode correctly identifies the KSBU, the device is put in said slot;
   said program then causes said system to check the device's unique identifier and integration license with the barcode/encryption identifier before linking the kiosk power with the electrical contacts on the device and links said KSB battery control system with the electrical contacts on the device before doing the battery swap;
   wherein said KSB memory chip of each device tracks movements of the KSB, ID, phone use and charging;
   when the checked barcode is correct, causes removal of the battery pack and inserts the battery pack in a slot to recharge;
   requests the customer pay for a replacement battery pack and then issues the new replacement battery pack;
   otherwise said computer will prevent the device to link to said power in the kiosk;
   wherein each of said devices include poles and each said KSB comprises holes through which said poles of a device in a slot connect with;
   said poles being sealed into the device to prevent moisture;
   wherein each of said battery holes comprise sealing rings that prevents any moisture entering the battery pack or KSB when the poles and sealing rings are aligned;
   the computer control system (CCS) for the KSB contacts, the KSB contacts including a contact either underneath the battery or on one of the device pole contact sites or on an extension/protrusion of the battery (KSB), that allows the device to upload and receive information;
   all extensions and contact point/poles being sealed into the back of the device and/or battery pack to prevent moisture entry and have a rubber/plastic sealing ring on the outside to prevent moisture entry into the contact area when the KSB or battery pack is in position;
   wherein said poles has multiple contact points;
   each pole having at least two or more contact sites separated by insulating material and align with contacts within the device/battery pack holes to receive/transmit power and/or information; and
   the batteries may also have a pole for contact sets in the middle between the two holes or alternatively a third hole with a third pole in the device to handle communication transmissions.

2. The system according to claim 1 wherein the battery pack comprises an extra pin between the main pinholes to allow devices and chargers to easily recognize the type of battery said extra pin will allow the battery to be installed.

3. The system according to claim 2 wherein each said device has one resident battery which is inbuilt and one or more swap batteries which are stored in receptacles on the rear of the device and covered by doors that open, close and lock.

4. A system for enabling electrical devices, each having a unique identifier and electrical contacts, to exchange a Kiosk Swap Battery (KSB), including at least one of a battery, battery fluids, reagents that supply the energy for at least one of a battery, device with new recharged batteries, battery fluids or reagents, for use in equipment including at least one of a vehicle, excavating and earthmoving equipment, tractors and agricultural equipment, aircraft, smaller devices such as mobile phones, telecommunication devices and portable computers;
   said devices being powered by a KSB which can be swapped at a reception area, shop, or in one of a number of automated self-service kiosks, said kiosks being located in vendor sites having different dimensions depending on where said kiosk is located, including at least one of a counter-top or a floor-standing kiosk; and
   comprising multiple KSB positions to accommodate different size KSBs;
   said kiosk further comprising an on-board processor/computer;
   a power a power connection;
   a slot for receiving at least one of currency;
   a card reader/key pad as required;

a contactless payment sensor;

an outlet for change and at least one slot designed to receive one of said devices and to read the unique identifier associated with the device to allow tracking the device the KSB is coming from and the KSB being released to that device;

each of said slots comprising a clamp to support at least one of a battery, telecommunication device or portable computing device while in said slot and wherein said computer causes said clamp to close to capture and retain the device in the slot when said read unique identifier indicates that the device in the slot is stolen or illegal, and wherein each said Kiosk Swap Battery (KSB) comprises a battery control system, a memory chip and an associated barcode, and each said device has an associated integration license with a unique barcode/encryption identifier and a battery pack, said kiosk further comprising:

a barcode reader connected to said computer and wherein the battery pack is removed from said device and is replaced with a fully charged battery pack during the swap procedure, said kiosk computer system being connected to said barcode reader and programmed to first cause said barcode reader to check the KSB (Kiosk Swap Battery) barcode;

if the read barcode is in order, the device is put in said slot;

said program then causes said system to check the device's unique identifier and integration license with the barcode/encryption identifier before linking the kiosk power with the electrical contacts on the device and links said KSB battery control system with the electrical contacts on the device, before doing the battery swap;

wherein said KSB memory chip of each device tracks the movements, ID, phone use and charging of the device and causes removal the battery pack and inserts the battery pack in a slot to recharge the device after said computer verifies the barcode of the device; requests the customer pay for a replacement battery pack and then issues the new replacement battery pack;

however, said computer will prevent the device from linking to said power in the kiosk unless the device barcode is verified and wherein each of said devices include poles and each said KSB comprises holes through which said poles of a device in a slot connect;

said poles being sealed into the device so that moisture cannot enter the device;

wherein each of said battery holes comprises surrounding sealing rings which prevents moisture from entering the battery pack or KSB;

the computer control system (CCS) on the KSB contacts, a contact either underneath the battery or on one of the device pole contact sites or on an extension/protrusion of the battery (KSB), allowing the device to upload and receive information;

all extensions and contact point/poles are sealed into the back of the device and/or battery pack to prevent moisture entry and have a rubber/plastic sealing ring on the outside to prevent moisture entry into the contact area when the KSB or battery pack is in position;

wherein said poles may have multiple contact points;

wherein said poles comprise two or more contact sites which are separated by insulating material and align with contacts within the device/battery pack holes so as to receive/transmit power and/or information; and the batteries may also have a pole for contact sets in the middle between the two holes or alternatively a third hole with a third pole in the device to handle communication transmissions.

* * * * *